United States Patent [19]

Burland

[11] 3,821,541
[45] June 28, 1974

[54] FLASHING SIGNAL LIGHT
[76] Inventor: Oliver J. Burland, 214 Rugby Rd., Western Springs, Ill. 60558
[22] Filed: Jan. 24, 1973
[21] Appl. No.: 326,433

[52] U.S. Cl.............. 240/22, 240/41.6, 240/49, 340/49
[51] Int. Cl................. F21l 15/02, F21q
[58] Field of Search ........... 240/1.2, 8.18, 22, 24, 240/41.6, 49, 62; 340/87, 49, 25, 50

[56] References Cited
UNITED STATES PATENTS
2,446,333   8/1948   Kennelly ................ 240/49
2,456,287   12/1948  Kennelly ................ 240/49 X
2,795,772   6/1957   Habsburg-Lothringen ... 240/7.7 X Primary Examiner—Samuel S. Matthews
Assistant Examiner—Richard A. Wintercorn
Attorney, Agent, or Firm—Dawson, Tilton, Fallon & Lungmus

[57] ABSTRACT

A flashing signal light includes a pair of generally vertically spaced lamps mounted on a lamp frame which is pivotable about vertical and horizontal axes. A motor within the casing includes a pair of drive shafts, and a link connects each drive shaft to the frame for pivoting the frame about one of the axes. The frame pivots faster about the horizontal axis than the vertical axis, and a pair of springs extend from the lamp frame on opposite sides of the horizontal axis to the casing for cushioning shocks and vibration in the drive train for pivoting the frame about the horizontal axis as the drive link reaches the end of each reciprocation.

10 Claims, 4 Drawing Figures

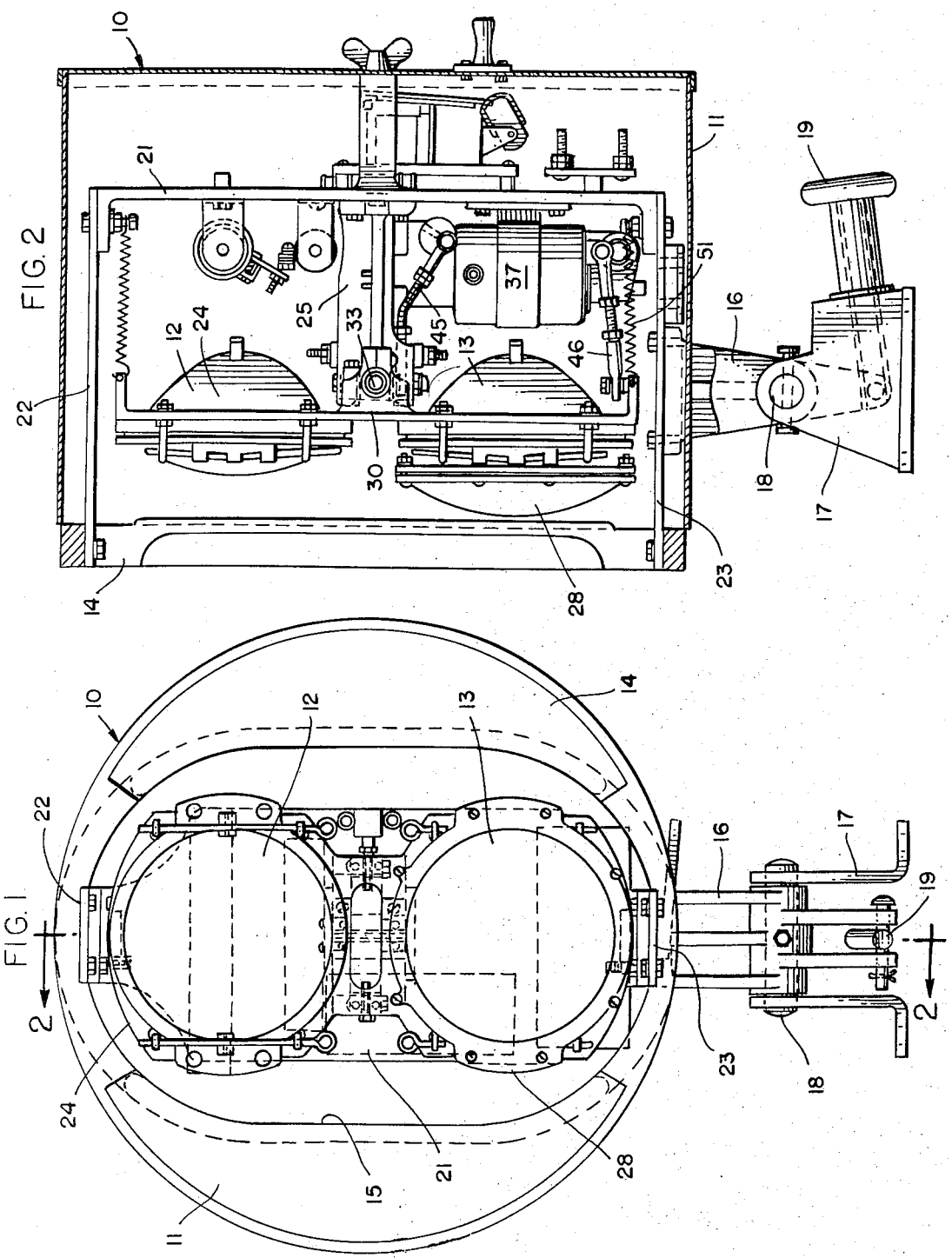

PATENTED JUN 28 1974 3,821,541
SHEET 2 OF 2
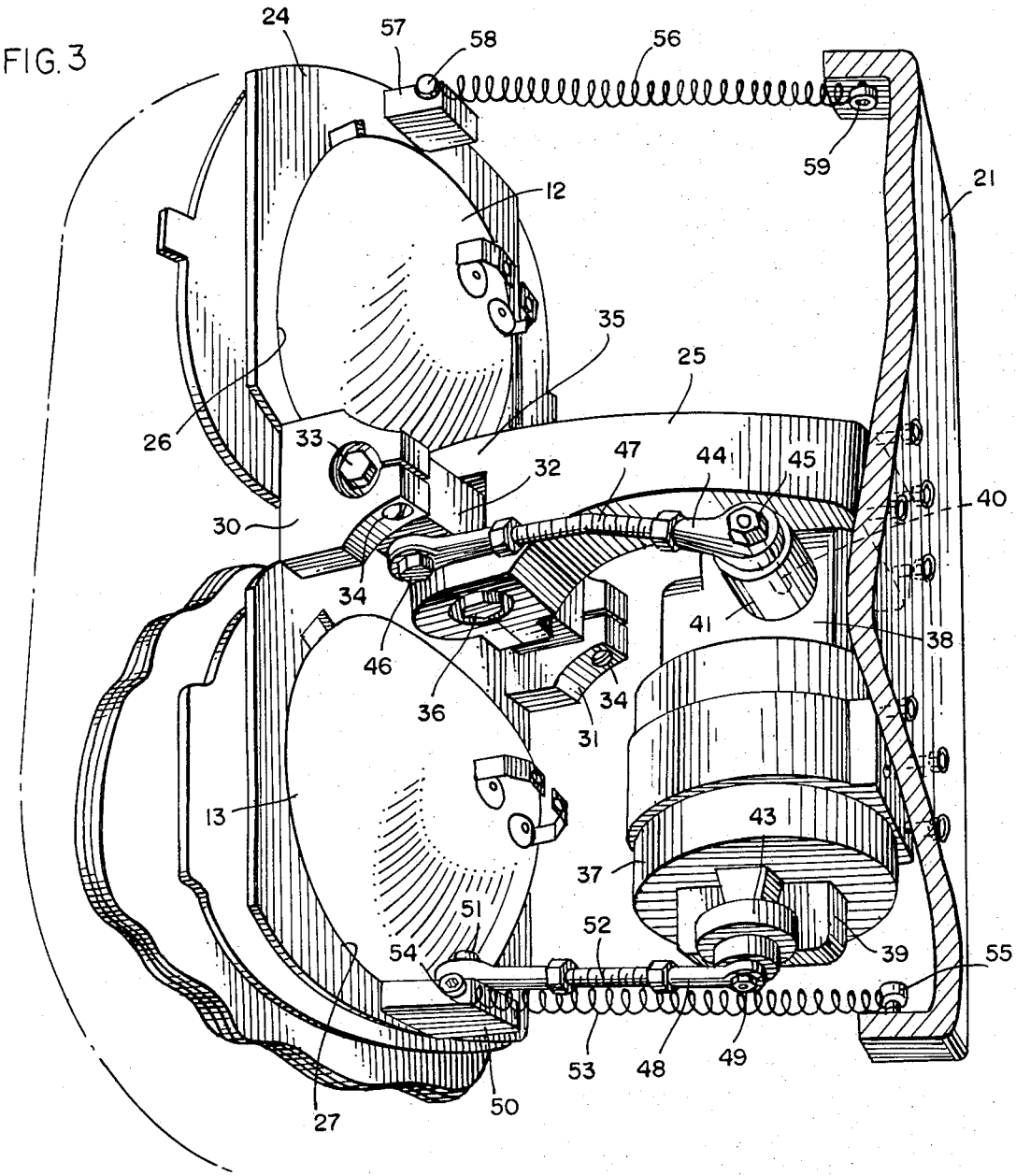

FLASHING SIGNAL LIGHT

BACKGROUND AND SUMMARY

This invention relates to a flashing signal light which is particularly suitable for use in warning people of the approach of fire trucks, trains, and other vehicles.

Flashing signal lights have been provided in the past which include a pair of lamps which are pivotable about vertical and horizontal axes. However, I have found that pivoting the lamps about the horizontal axis faster than about the vertical axis provides a particularly effective beam pattern. This pattern not only alerts people in the path of the vehicle but sweeps the area in front of the vehicle to give the person controlling the vehicle a good view of possible obstacles. Further, since the lamp frame is being pivoted relatively fast about the horizontal axis, I provide springs which are tensioned and compressed as the frame approaches the extremes of its swinging movement about that axis. The frame is brought to rest by the drive link at the end of each swing before reversing its movement, and the springs cushion and absorb the shocks which would otherwise be imposed on the drive train.

DESCRIPTION OF THE DRAWING

The invention will be explained in conjunction with an illustrative embodiment shown in the accompanying drawing, in which:

FIG. 1 is a front elevational view of a flashing signal light constructed in accordance with the invention;

FIG. 2 is a sectional view taken along the line 2—2 of FIG. 1;

FIG. 3 is an enlarged fragmentary perspective view of a portion of the light; and FIG. 4 is a schematic diagram of the beam pattern produced by the light.

DESCRIPTION OF SPECIFIC EMBODIMENT

Referring now to the drawing, the numeral 10 designates generally a flashing signal light which includes a casing 11 and a pair of vertically spaced sealed beam lamps 12 and 13. The particular light illustrated is suitable for use in fire trucks and locomotives, and the casing includes a circular front plate 14 having an oval central opening 15 therein for exposing the lamps. The casing is supported by a yoke 16 which is pivotally secured to a supporting shoe 17 by means of a shaft 18, and the casing can be pivoted in a vertical plane by an adjusting screw 19 which is mounted on the shoe and connected to the lower end of the yoke. The casing 11 also includes a back plate 21 and top and bottom plates 22 and 23 which extend between the front plate 14 and the back plate 21 and are connected thereto.

The lamps 12 and 13 are secured to an elongated generally vertically extending lamp frame 24, and the lamp frame is mounted for pivoting about vertical and horizontal axes by support arm 25 which is bolted to the back plate 21 and extends forwardly therefrom. The lamp frame is provided with a pair of circular openings 26 and 27 (FIG. 3) for receiving the dome-like back ends of the lamps, and the lamps may be releasably secured to the lamp frame in the conventional manner. In the particular embodiment illustrated a red lens 28 is mounted on the frame in front of the lower lamp 13 so that the light provides an upper white beam and a lower red beam.

Referring now to FIG. 3, the lamp frame 24 includes a pair of rearwardly extending bifurcated lugs 30 and 31 which are pivotally mounted on a bar 32 by means of horizontally extending trunnions 33 which are rotatably held by suitable bearings carried by the lugs 30 and 31. The clamping pressure of the bifurcated lugs on the trunnions can be adjusted by means of screws 34. The bar 32 is supported for pivotal movement in about a vertical axis by the forward clevis-like end portion 35 of the support arm 25 and pin 36 which extends vertically through the clevis and the bar.

An electric motor 37 is secured to the back plate 21 and includes upper and lower gear casings 38 and 39. Each of the gear casings is conventional and includes suitable gearing for transmitting the rotation of a generally vertically extending main drive shaft of the motor to a horizontally extending drive shaft which extends outwardly from the gear casing. The horizontally extending drive shaft 40 of the upper gear casing 38 carries a wheel 41, and the horizontally extending drive shaft 42 of the lower gear casing carries a wheel 43. One end of a driving link 44 is eccentrically connected to the wheel 41 by screw 45, and the other end of the link is connected to the bar 32 by screw 46 at a point laterally offset from the pivot pin 36. The link 44 includes a central threaded portion 47 which is threadedly received by the end portions of the link to permit the length of the link to be adjusted as desired.

Similarly, one end of a driving link 48 is eccentrically connected to the wheel 43 by screw 49, and the other end of the link is connected to a lug 50 extending rearwardly from the bottom of the lamp frame by a screw 51 The driving link 46 also includes a central threaded portion 52 for adjusting the length of the link.

A coil spring 52 is secured to the lug 50 adjacent the connection of the link 48 to the lug by a screw 54, and the other end of the spring is secured to the back plate 21 by screw 55. Another coil spring 56 is secured to a rearwardly extending lug 57 at the upper end of the lamp frame by screw 58 and is secured to the upper end of the back plate 21 by screw 59.

The pivot pin 36 and the lugs 50 and 57 are generally aligned along the vertical centerline of the lamp frame and lamps, and the lugs are about equally spaced from the horizontal axis through the pivot pins 33. The pivot pins 33 are positioned about midway between the two lamps.

The operation of the light is apparent from the foregoing description. As the drive shaft of the upper gear casing 38 rotates the wheel 41, the crank action provided by the eccentrically mounted drive link 42 swings the bar 32 back and forth about the pivot 36 and pivots the lamps about a vertical axis. As the drive shaft of the lower gear casing 39 rotates the wheel 43, the eccentrically mounted drive link 48 moves the bottom of the lamp frame toward and away from the drive shaft and pivots the lamps about a horizontal axis extending through the pivot pins 33.

I have found that selecting the gearing of the upper and lower gear casings so that the wheel 43 rotates approximately three times faster than the wheel 41 provides a particularly effective light beam pattern which is illustrated diagrammatically in FIG. 4. The numeral 60 indicates the beginning of a cycle when the drive link 44 is at one of its extreme positions and the drive link 48 is midway between its extreme positions. The solid line 61 indicates the path of a beam during the next one-half rotation of the wheel 41, and the dotted line 62 indicating the path of a beam during the following one-half rotation of the wheel 41. Since the lamps are being rotated simultaneously about horizontal and vertical axes, the beams of the lamps trace generally sinusoidal paths, and the faster pivoting of the lamps about the horizontal axis traces a beam pattern of about 1½ sine waves during each one-half rotation of the wheel 41.

Other beam patterns can be provided by changing the relative rotational speeds of the wheels 40 and 41, by changing the lengths of the drive links, or by changing the relationship between the extreme positions for the horizontal and vertical pivoting.

The rate of reciprocation of the drive link 48 and the weight of the lamp frame and the lamps provide the pivoting structure with substantial momentum as the swinging structure oscillates about the horizontal axis from one extreme position to the other. As the driving link reaches the limit of its reciprocation in either direction, considerable force is exerted on the components of the drive train in the lower gear casing as the swinging frame is brought to rest before beginning its return to the other extreme position, and the shocks and vibrations which are transmitted by the link to the drive gearing increase as the various parts wear. The resilient coil springs 53 and 56 serve to cushion these forces.

As the lamp frame pivots clockwise about the horizontal pivot 33, the coil spring 53 is tensioned to assist in smoothly bringing the lamp frame to rest at one extreme position, and as the lamp frame pivots counterclockwise, the spring 56 is tensioned to assist in smoothly bringing the lamp frame to rest at the other extreme position. Additional cushioning effect can be provided by choosing a spring which can be both tensioned and compressed and which is in a neutral or untensioned condition when the lamp frame is midway between its extreme positions. Each spring will then be compressed as the lamp frame pivots in one direction and will be tensioned as the lamp frame pivots in the other direction. By using a spring which is alternately compressed and tensioned, advantageous cushioning effect can be obtained from a single spring located at either the top or the bottom of the lamp frame. However, I find that even better cushioning effect is obtained from using a pair of such springs as illustrated.

The use of the cushioning springs substantially reduces the vibration and shock on the various parts of the drive train between the motor and the lamp frame, particularly the components within the lower gear casing 39, and substantially increases the life of these parts.

While in the foregoing specification, a detailed description of a specific embodiment of the invention was set forth for the purpose of illustration, it is to be understood that many of the details herein given may be varied considerably by those skilled in the art without departing from the spirit and scope of the invention.

I claim:

1. A light structure comprising a casing, a light frame pivotally mounted on the casing for pivotal movement about first and second generally perpendicularly related axes, a lamp mounted on the lamp frame, a motor mounted on the casing and having a pair of drive shafts, first crank means connecting one of the drive shafts to the lamp frame for pivoting the lamp frame about the first axis, second crank means connecting the other drive shaft to the lamp frame for pivoting the lamp frame about the second axis, and spring means extending between the lamp frame and the casing for resiliently resisting pivotal movement of the lamp frame about one of the axes, a second lamp mounted on the lamp frame in spaced relation to the first lamp, the first pivotal axis extending generally parallel to a center line extending between the two lamps and the second pivotal axis extending between the two lamps and generally perpendicularly to a center line, the spring means comprising a coil spring connected to the lamp frame at a point spaced from the second axis whereby the spring is tensioned and compressed as the lamp frame pivots about the second axis.

2. The structure of claim 1 in which the lamp frame has a pair of ends on opposite sides of the second axis, the second crank means and the spring being connected to the lamp frame adjacent one of the ends thereof.

3. The structure of claim 2 including a second coil spring connected to the casing and to the lamp frame adjacent the other end thereof whereby the first spring is tensioned when the lamp frame pivots in one direction about the second axis and the second spring is tensioned when the lamp frame pivots in the other direction about the second axis.

4. The structure of claim 1 in which the second drive shaft rotates faster than the first drive shaft whereby the lamp frame pivots faster about the second axis than about the first axis.

5. The structure of claim 1 in which the second drive shaft rotates about three times faster than the first drive shaft whereby each light beam of the lamps traces a generally sinusoidal path comprising about one and a half sine waves during a half cycle of pivotal movement about the first axis.

6. A light structure comprising a casing, a generally vertically extending lamp frame pivotally mounted on the casing for pivotal movement about generally vertical and horizontal axes, a pair of lamps mounted on the lamp frame above and below the horizontal pivotal axis, a motor mounted on the casing and having a pair of drive shafts, a first link connected to the lamp frame laterally of the vertical pivotal axis and eccentrically connected to one of the drive shafts for pivoting the lamp frame about the vertical axis, a second link connected to the lamp frame at a point spaced from the horizontal axis and eccentrically connected to the other drive shaft for pivoting the lamp frame about the horizontal axis, a coil spring having one end connected to the casing and the other end connected to the lamp frame at a point spaced from the horizontal axis, the spring being tensioned as the lamp frame pivots in one direction about the horizontal axis.

7. The structure of claim 6 including a second spring having one end connected to the casing and the other end connected to the lamp frame at a point spaced from the horizontal axis, the two springs being generally equally spaced from the horizontal axis on opposite sides thereof, the second spring being tensioned as the lamp frame pivots in the other direction about the horizontal axis.

8. The structure of claim 7 in which the lengths of the springs are such that the first spring is compressed as the second spring is tensioned and the second spring is compressed as the first spring is tensioned.

9. The structure of claim 8 in which the other drive shaft rotates about three times faster than said one drive shaft whereby each light beam of the lamps traces a generally sinusoidal path comprising about one and a half sine waves during a half cycle of pivotal movement about the vertical axis.

10. The structure of claim 6 including a second spring having one end connected to the casing and the other end connected to the lamp frame at a point spaced from the horizontal axis, the two springs being generally equally spaced from the horizontal axis on opposite sides thereof, each spring being in a substantially untensioned condition when the lamp frame is midway between the extremes of pivotal movement about the horizontal axis, the first spring being tensioned and the second spring being compressed as the lamp frame pivots in one direction about the horizontal axis toward one extreme position and the first spring being compressed and the second spring being tensioned as the lamp pivots in the other direction about the horizontal axis toward the other extreme position, the other drive shaft being rotatable about three times faster than said one drive shaft whereby each light beam of the lamps traces a generally sinusoidal path comprising about one and a half sine waves during a half cycle of pivotal movement about the vertical axis.

* * * * *